(12) United States Patent
Yoneda et al.

(10) Patent No.: US 10,460,767 B2
(45) Date of Patent: Oct. 29, 2019

(54) BASE MEMBER INCLUDING INFORMATION MARK AND INSULATING COATING LAYER, AND DISK DRIVE APPARATUS INCLUDING THE SAME

(71) Applicant: Nidec Corporation, Kyoto (JP)

(72) Inventors: Tomohiro Yoneda, Kyoto (JP); Takaharu Funatsu, Kyoto (JP); Akitsugu Miwa, Kyoto (JP); Masakazu Matsuyama, Kyoto (JP); Junzo Fujinawa, Kyoto (JP); Tadahiro Kuramoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/147,935

(22) Filed: Oct. 1, 2018

(65) Prior Publication Data

US 2019/0139579 A1    May 9, 2019

(30) Foreign Application Priority Data

Nov. 8, 2017  (JP) .................................. 2017-215333

(51) Int. Cl.
| | | |
|---|---|---|
| *G11B 33/02* | (2006.01) | |
| *G11B 23/03* | (2006.01) | |
| *G11B 23/38* | (2006.01) | |
| *G11B 25/04* | (2006.01) | |

(52) U.S. Cl.
CPC ........ *G11B 33/022* (2013.01); *G11B 23/0326* (2013.01); *G11B 23/38* (2013.01); *G11B 25/043* (2013.01)

(58) Field of Classification Search
CPC ... G11B 33/022; G11B 23/0326; G11B 23/38; G11B 25/043
See application file for complete search history.

(56) References Cited

U.S. PATENT DOCUMENTS

| | | | | |
|---|---|---|---|---|
| 4,831,353 A | * | 5/1989 | Gaia .................. | H01H 85/0417 29/623 |
| 5,454,157 A | * | 10/1995 | Ananth ................ | G11B 33/121 29/467 |
| 5,673,159 A | * | 9/1997 | Jinbo ................... | G11B 25/043 360/98.01 |
| 6,270,728 B1 | * | 8/2001 | Wijnschenk .......... | B01L 3/5453 422/549 |
| 7,385,784 B1 | * | 6/2008 | Berding ................ | G11B 5/102 360/97.19 |
| 7,420,771 B1 | * | 9/2008 | Hanke .................. | G11B 25/043 360/97.16 |

(Continued)

FOREIGN PATENT DOCUMENTS

| | | | |
|---|---|---|---|
| JP | 2001101777 A | * | 4/2001 |
| JP | 2011-113589 A | | 6/2011 |

*Primary Examiner* — Brian E Miller
(74) *Attorney, Agent, or Firm* — Keating & Bennett, LLP (57) ABSTRACT

A base member is structured to define a portion of a casing in which a gas with a density lower than that of air is to be sealed and to support a motor to be housed in the casing. The base member includes a base body made of a cast material, an information mark, and an insulating coating layer. The information mark includes casting information and is located on a portion of a surface of the base body. The insulating coating layer is defined on the surface of the base body and covers the information mark.

10 Claims, 4 Drawing Sheets

(56) References Cited

U.S. PATENT DOCUMENTS

| | | | |
|---|---|---|---|
| 8,339,733 B2* | 12/2012 | Ikegawa | G11B 19/2009 29/603.03 |
| 8,358,484 B2 | 1/2013 | Nagai et al. | |
| 8,720,720 B2* | 5/2014 | Li | B29C 45/14344 220/62.22 |
| 8,773,813 B2 | 7/2014 | Nagai et al. | |
| 8,824,099 B2* | 9/2014 | Petersen | G11B 17/0287 360/99.12 |
| 8,837,080 B2* | 9/2014 | McGuire, Jr. | G11B 25/043 360/97.19 |
| 9,570,114 B1* | 2/2017 | Sudo | G11B 33/1486 |
| 10,002,645 B2* | 6/2018 | McGuire, Jr. | G11B 25/043 |
| 2004/0111732 A1* | 6/2004 | Park | G11B 17/047 720/650 |
| 2005/0213458 A1* | 9/2005 | Iwase | H01L 23/544 369/53.35 |
| 2009/0123102 A1* | 5/2009 | Kubo | B60B 7/0013 384/544 |
| 2011/0128647 A1* | 6/2011 | Gauzner | B82Y 10/00 360/75 |
| 2012/0275286 A1* | 11/2012 | McGuire, Jr. | G11B 25/043 369/75.11 |
| 2013/0063838 A1* | 3/2013 | Otake | G11B 25/043 360/97.12 |
| 2013/0335859 A1* | 12/2013 | Tatsumi | G11B 33/02 360/99.08 |
| 2016/0104515 A1* | 4/2016 | Strange | G11B 25/043 360/99.18 |
| 2017/0370115 A1* | 12/2017 | Gray | E04B 1/947 |

\* cited by examiner

BASE MEMBER INCLUDING INFORMATION MARK AND INSULATING COATING LAYER, AND DISK DRIVE APPARATUS INCLUDING THE SAME

CROSS REFERENCE TO RELATED APPLICATIONS

This application claims the benefit of priority to Japanese Patent Application No. 2017-215333 filed on Nov. 8, 2017. The entire contents of this application are hereby incorporated herein by reference.

BACKGROUND OF THE INVENTION

1. Field of the Invention

The present invention relates to a base member, and a disk drive apparatus including the same.

2. Description of the Related Art

A base member including an inner surface on which a motor is to be installed, and which defines a portion of a casing in which the motor is to be housed, has been known. JP-A 2009-211740 describes a base plate, which is a base member of this type.

The base plate described in JP-A 2009-211740 defines a portion of a casing of a hard disk drive. A spindle motor, an actuator, and so on, which are housed in the casing, are installed on the base plate. The base plate is obtained by, for example, precision machining a blank obtained by an aluminum die casting process using a machining center or the like.

In more detail, in a process of manufacturing the base plate described in JP-A 2009-211740, the blank is molded by casting, and then, the blank is provided with an insulating coating, and is subjected to inner surface processing, outer surface processing, etc., to complete the base plate. After manufacture of the base plates, nonconforming products are eliminated, and thereafter, two-dimensional bar codes representing manufacturing information are written on conforming products. In a process of producing a disk drive apparatus including the base plate described in JP-A 2009-211740, after a pre-shipment inspection, a production lot number, a date, processing machine information, etc., which are read from the two-dimensional bar code representing the manufacturing information, are finally checked and are registered in a production management database. This arrangement presumably allows management of the production of individual base plates.

Here, it is difficult to determine whether a casting process has a problem immediately after the blank, which is to define a main body of the base plate, is manufactured by the casting process. It is quite possible that a problem of the casting process will be found as a result of a dimensional inspection or an airtightness inspection performed after the inner surface processing and the outer surface processing in subsequent stages, for example. In particular, in the case where a gas having a low density, such as, for example, helium, is sealed in the casing defined by the base plate, airtightness should be realized with high accuracy, and it is desirable that any possible improvement in the casting process would be quickly known.

However, in the case of the base plate described in JP-A 2009-211740, a problem in the casting process might be noticed by a manufacturer only at a later time. Moreover, even if a problem in the casting process is noticed early, it will still be difficult to identify a cause for the abnormality among a number of casting conditions. This may result in a reduced yield, and an increased cost of scrapping nonconforming items.

SUMMARY OF THE INVENTION

In view of the above circumstances, preferred embodiments of the present invention achieve an improved yield and a reduced cost of scrapping nonconforming items.

According to a preferred embodiment of the present invention, a base member is structured to define a portion of a casing in which a gas with a density lower than that of air is to be sealed and to support a motor to be housed in the casing. The base member includes a base body made of a cast material, an information mark, and an insulating coating layer. The information mark includes casting information, and is located on a portion of a surface of the base body. The insulating coating layer is defined on the surface of the base body, and covers the information mark.

Preferred embodiments of the present invention achieve an improved yield and a reduced cost of scrapping nonconforming items.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. Note that, in the description of the present invention, a direction parallel to a rotation axis of a disk is sometimes referred to by the term "axial direction", "axial", or "axially", that directions perpendicular to the rotation axis of the disk are each sometimes referred to by the term "radial direction", "radial", or "radially", and that a direction along a circular arc centered on the rotation axis of the disk is sometimes referred to by the term "circumferential direction", "circumferential", or "circumferentially". Also note that, in the description of the present invention, the shape of each member or portion and relative positions of different members or portions will sometimes be described assuming that an axial direction is a vertical direction, and a side on which a cover is arranged with respect to a base member is an upper side. It should be noted, however, that the above definitions of the vertical direction and the upper and lower sides are not meant to restrict in any way the orientation of a base member or a disk drive apparatus according to any preferred embodiment of the present invention when in use.

Also note that the term "parallel" as used herein includes both "parallel" and "substantially parallel". Also note that the term "perpendicular" as used herein includes both "perpendicular" and "substantially perpendicular".

Figure 1:
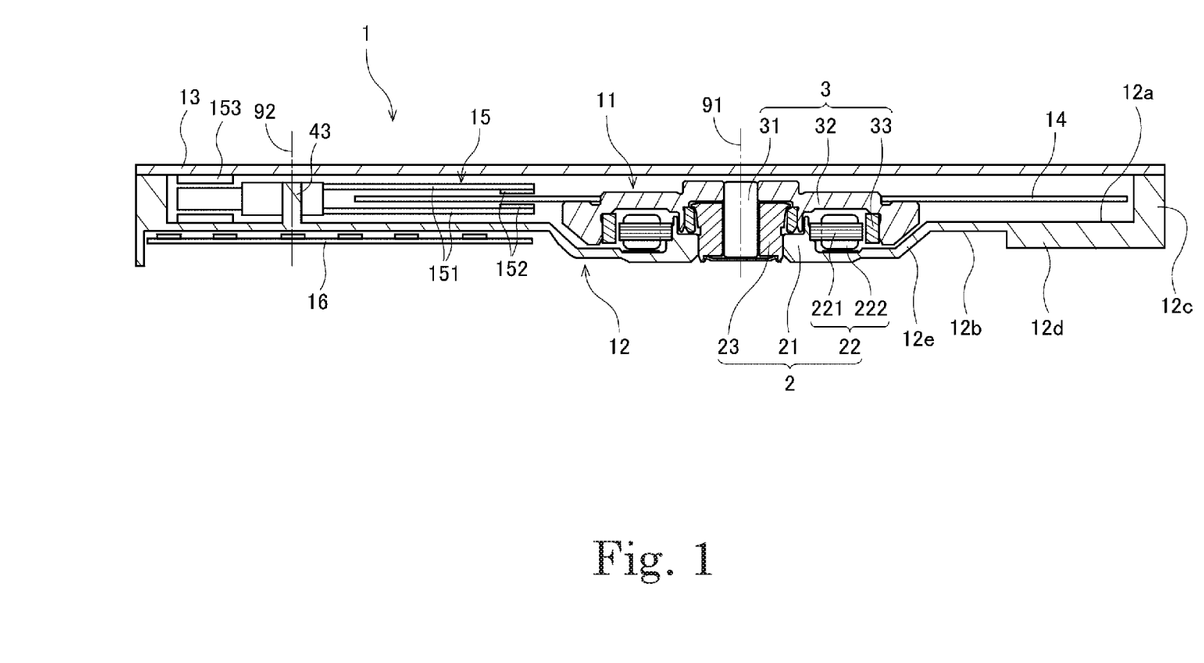
FIG. 1 is a sectional view of a disk drive apparatus including a base member according to a preferred embodiment of the present invention.

Hereinafter, the overall structure of a disk drive apparatus 1, which includes a base member 12 according to a preferred embodiment of the present invention, will be described with reference to FIG. 1. FIG. 1 is a vertical sectional view of the disk drive apparatus 1 according to the present preferred embodiment.

The disk drive apparatus 1 according to the present preferred embodiment is an apparatus arranged to perform reading and writing of information from or to a disk-shaped magnetic disk (i.e., a disk) 14 including a circular hole in a center thereof while rotating the magnetic disk 14. Referring to FIG. 1, the disk drive apparatus 1 includes, as primary components thereof, a spindle motor (i.e., a motor) 11, the base member 12, a cover 13, the magnetic disk 14, an access portion 15, and a circuit board 16.

The spindle motor 11 is a device arranged to rotate the magnetic disk 14 about a first axis 91 while supporting the magnetic disk 14. The spindle motor 11 includes a stationary portion 2 and a rotating portion 3. The stationary portion 2 is arranged to be stationary relative to both the base member 12 and the cover 13. A rotating magnetic field is generated in the stationary portion 2. The rotating portion 3 is supported to be rotatable with respect to the stationary portion 2. The rotating portion 3 is arranged to rotate through interaction between magnetic flux of the rotating portion 3 and magnetic flux of the stationary portion 2.

The stationary portion 2 includes a stator support portion 21, a stator 22, and a bearing unit 23. The stator support portion 21 is arranged to extend in an axial direction to assume a cylindrical shape around the first axis 91. The stator support portion 21 defines a portion of the spindle motor 11 and a portion of the base member 12. The stator 22 includes a stator core 221, which is a magnetic body, and a plurality of coils 222. The stator core 221 is fixed to an outer circumferential surface of the stator support portion 21. The stator core 221 includes a plurality of teeth arranged to project radially outward. Each of the coils 222 is defined by a conducting wire wound around a separate one of the teeth. The bearing unit 23 is fixed to an inner circumferential surface of the stator support portion 21. The bearing unit 23 is arranged to rotatably support a shaft 31, which is included in the rotating portion 3. A fluid dynamic bearing mechanism, for example, is used as the bearing unit 23.

The rotating portion 3 includes the shaft 31, a hub 32, and a rotor magnet 33. The shaft 31 is a columnar member arranged to extend along the first axis 91. A lower end portion of the shaft 31 is housed inside of the bearing unit 23. The hub 32 is arranged to extend radially outward from a peripheral portion of an upper end portion of the shaft 31. The magnetic disk 14 is fixed to the hub 32 while being oriented perpendicular to the first axis 91. The rotor magnet 33 is fixed to the hub 32 radially outside of the stator 22. The rotor magnet 33 is arranged radially opposite to the teeth of the stator core 221 with a gap therebetween. A magnet in the shape of a circular ring, for example, is used as the rotor magnet 33. An inner circumferential surface of the rotor magnet 33 includes north and south poles arranged to alternate with each other in a circumferential direction.

Once electric drive currents are supplied to the coils 222 in the spindle motor 11 having the above-described structure, magnetic flux is generated around each of the teeth of the stator core 221. Then, a circumferential torque is produced by interaction between the magnetic flux of the teeth and magnetic flux of the rotor magnet 33, so that the rotating portion 3 is caused to rotate about the first axis 91 with respect to the stationary portion 2. The rotation of the rotating portion 3 causes the magnetic disk 14, which is fixed to the hub 32, to rotate about the first axis 91 along with the hub 32.

The base member 12 illustrated in FIG. 1 is a substantially plate-shaped member arranged to support the spindle motor 11 and the access portion 15. The base member 12 defines a portion of a casing arranged to house the spindle motor 11 and the access portion 15. The base member 12 is manufactured by subjecting a base body 19 (see FIG. 4, which will be described below), which is molded by pouring a molten metal into a mold and hardening the molten metal, to appropriate processes. The detailed structure of the base member 12 and a procedure for manufacturing the base member 12 will be described below.

The cover 13 is supported by an upper end surface of a side wall portion of the base member 12. An upper opening of the base member 12 is closed by the cover 13. The base member 12 and the cover 13 are fixed to each other through, for example, screwing, so that an enclosed space is defined therein. The casing arranged to house the spindle motor 11 and the access portion 15 is defined by the base member 12 and the cover 13. A gas (in the present preferred embodiment, helium) having a density lower than that of air is sealed in the casing according to the present preferred embodiment. This contributes to keeping resistance against rotation of the magnetic disk 14 low.

The access portion 15 includes arms 151, heads 152 arranged at tips of the arms 151, and an actuator mechanism 153. Each arm 151 is attached to a pivot spot 43 of the base member 12 through a bearing. The actuator mechanism 153 is a mechanism to cause each of the arms 151 and the heads 152 to swing. Once the actuator mechanism 153 is driven, the arm 151 is caused to swing on a second axis 92. The associated head 152 is thus arranged to move along a recording surface (i.e., a recording layer including a metal film) of the magnetic disk 14. The heads 152 are arranged opposite to an upper surface and a lower surface of the magnetic disk 14, and are arranged to perform reading and writing of information from or to the magnetic disk 14.

Note that each head 152 may alternatively be arranged to perform only one of the reading and the writing of information from or to the magnetic disk 14. Also note that the disk drive apparatus 1 may alternatively be arranged to include two or more magnetic disks 14. Also note that the disk drive apparatus 1 may alternatively be an apparatus arranged to rotate an optical disk.

The circuit board 16 is fixed to a lower surface of a bottom plate portion of the base member 12. A so-called rigid board, which has a small degree of flexibility, for example, is used as the circuit board 16. An electrical circuit needed for an operation of the disk drive apparatus 1 is mounted on the circuit board 16. The electrical circuit may be a circuit for an operation of the spindle motor 11, a circuit for an operation of the actuator mechanism 153, or a circuit for detecting various signals. A plurality of electronic components used to form the electrical circuit are mounted on an upper surface of the circuit board 16. The circuit board 16 is connected to the coils 222 of the spindle motor 11 through a so-called flexible printed circuit board, which is highly flexible.

Figure 2:
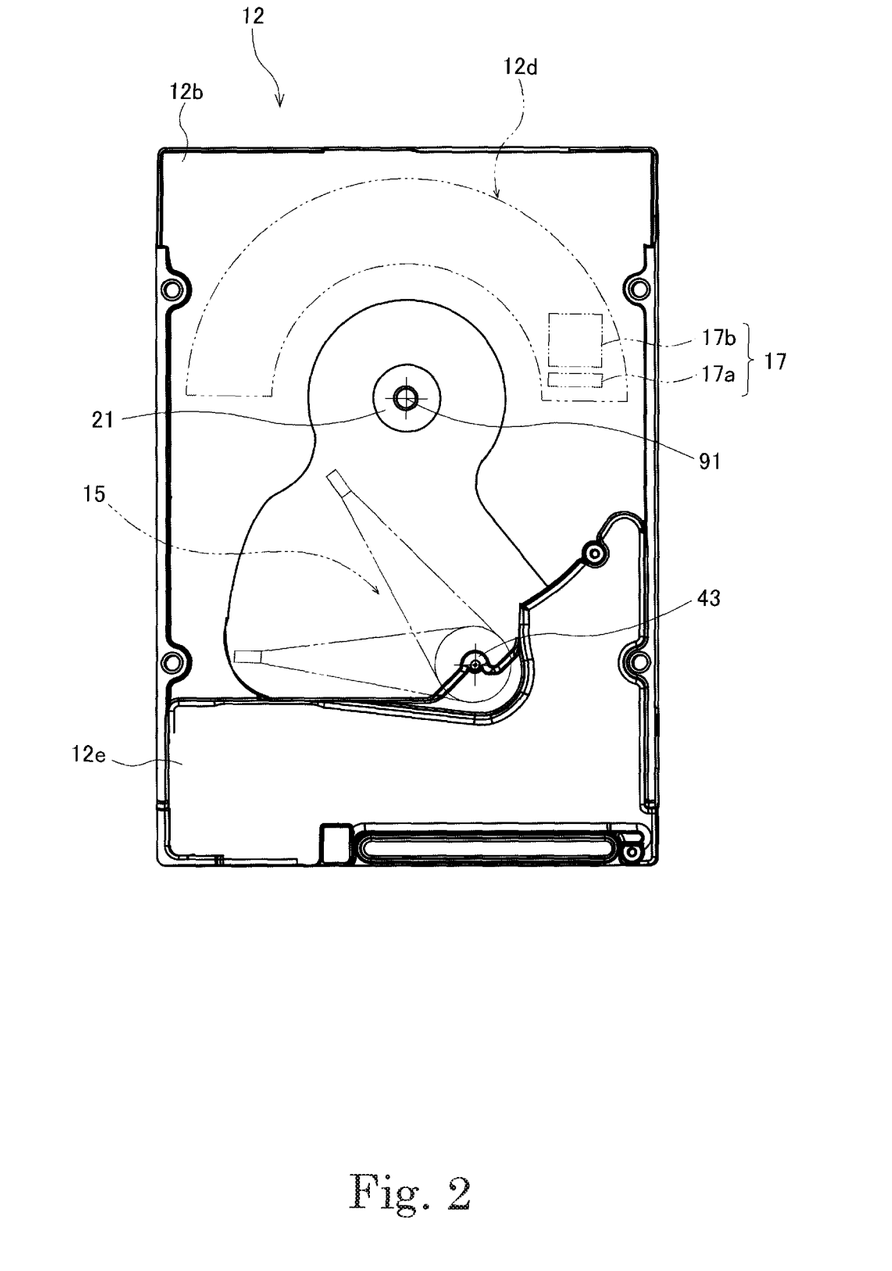
FIG. 2 is a diagram illustrating a rear surface of a base member according to a preferred embodiment of the present invention.

A more specific structure of the base member 12 according to the present preferred embodiment will now be described below with reference to FIGS. 1 and 2. FIG. 2 is a diagram illustrating a rear surface (i.e., a second surface) 12b of the base member 12.

A cylindrically projecting portion of the stator support portion 21 and the pivot spot 43 are defined at an inner surface (i.e., a first surface) 12a of the base member 12. In other words, projecting portions to allow installation of the spindle motor 11 and the access portion 15 are defined at the inner surface 12a, which is a surface of the base member 12 on a side on which the spindle motor 11 is arranged. In addition, at the inner surface 12a of the base member 12, a disk shroud 12c is defined along an outer circumference of the magnetic disk 14. The disk shroud 12c is defined radially outside of an outer circumferential portion of the magnetic disk 14, and is arranged to surround the outer circumferential portion of the magnetic disk 14.

In addition, the base member 12 includes an increased thickness portion 12d having a relatively large axial thickness, and a decreased thickness portion 12e having a relatively small axial thickness. Referring to FIG. 1, in an outer surface (i.e., the second surface) 12b of the base member 12, a shoulder is defined between the increased thickness portion 12d and the decreased thickness portion 12e. Referring to FIGS. 1 and 2, the increased thickness portion 12d lies inside of the disk shroud 12c when viewed in the axial direction.

As represented by a two-dot chain line in FIG. 2, the increased thickness portion 12d is defined in the shape of a circular arc radially outside of a region centered on the first axis 91 and having a radius equal to a half of a distance from the first axis 91 to the outer circumference of the magnetic disk 14 when viewed in the axial direction. Viewed from another point of view, the increased thickness portion 12d is defined in the shape of a circular arc in a region extending from an inner circumferential portion of the recording layer, including the metal film, of the magnetic disk 14 to the outer circumferential portion of the magnetic disk 14 when viewed in the axial direction. Thus, in the base member 12 according to the present preferred embodiment, the region of the increased thickness portion 12d is arranged to be relatively narrow to prevent a blowhole from being defined in a thick portion of the base member 12. This contributes to maintaining the sealing performance of the base member 12 at a high level.

Referring to FIG. 2, an information mark 17 including casting information is placed on a portion of a portion of the rear surface of the base member 12 which corresponds to the increased thickness portion 12d. In the present preferred embodiment, the information mark 17 includes a numeric string portion 17a, which is visually readable by a human, and a two-dimensional image portion 17b, which is readable by a reading device.

The numeric string portion 17a illustrated in FIG. 2 is, for example, a string of numbers representing a casting machine number for identifying a casting machine used to mold the base body 19 of the base member 12, and a casting date and time for identifying the date and time of the casting of the base body 19. More specifically, the first two digits and the remaining, last six digits of the numeric string portion 17a may represent the casting machine number and the casting date and time, respectively, for example.

The two-dimensional image portion 17b illustrated in FIG. includes information of a minimum injection speed, a maximum injection speed, and a casting pressure, in addition to information of the casting machine number of the casting machine used to mold the base body 19 of the base member 12, and the casting date and time. The minimum injection speed is the lowest speed at which the molten metal is poured into the mold. The maximum injection speed is the highest speed at which the molten metal is poured into the mold. The casting pressure is a pressure applied when the molten metal is forced into the mold. The two-dimensional image portion 17b according to the present preferred embodiment may be a two-dimensional bar code, for example.

As will be described in detail below, the information mark 17 is placed on the base body 19 by being engraved on the rear surface of the base body 19 using a laser marker after the molding of the base body 19 and before an insulating coating layer 18 is defined on a surface of the base body 19. Accordingly, the information mark 17 is covered by the insulating coating layer 18 (see FIG. 4).

The information mark 17 having the above-described structure is read at various times after the base body 19 is molded by casting and is provided with the insulating coating. Examples of such various times include times of various production processes, and a time when some abnormality has occurred in any stage after provision to the market. The readability of the casting information from the information mark 17 makes it possible to consider at various times whether a cause for an abnormality can be found in a casting process performed in an earlier stage.

Figure 3:
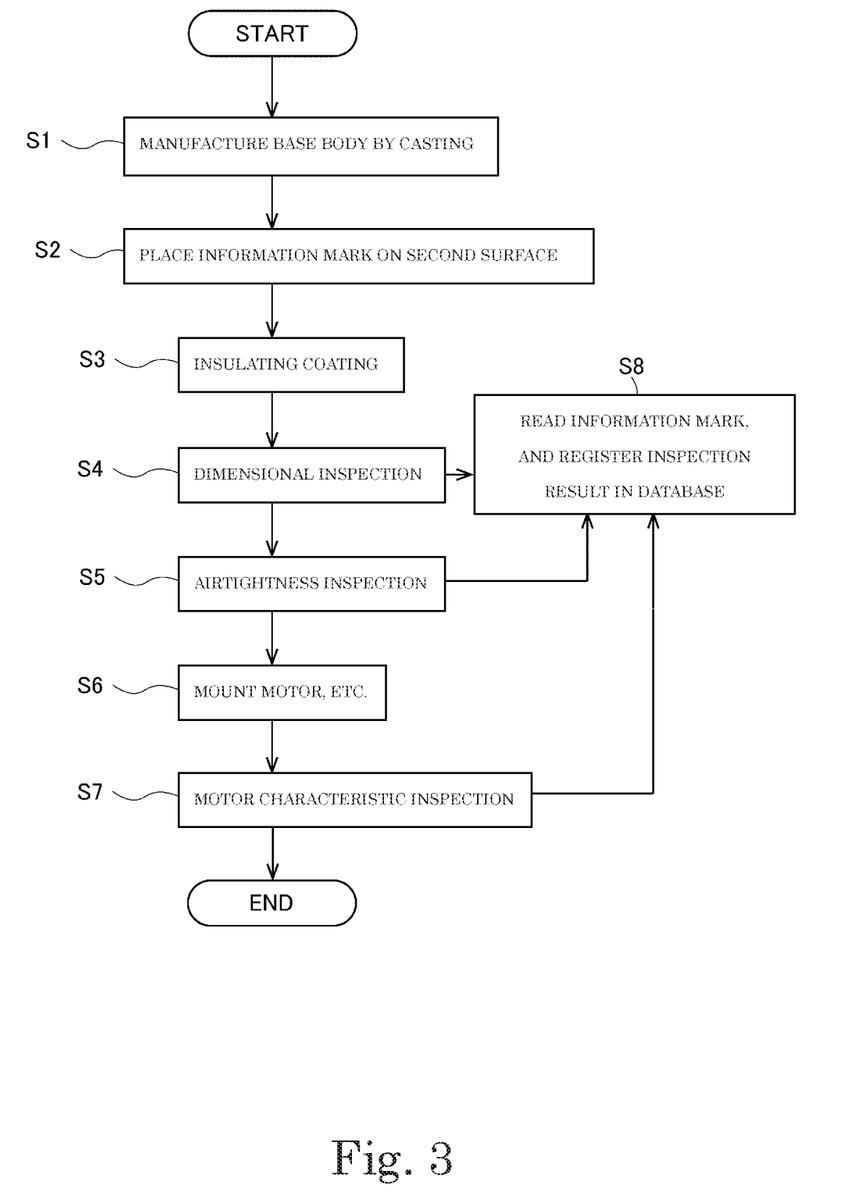
FIG. 3 is a diagram illustrating a procedure for manufacturing a disk drive apparatus according to a preferred embodiment of the present invention.
Figure 4:
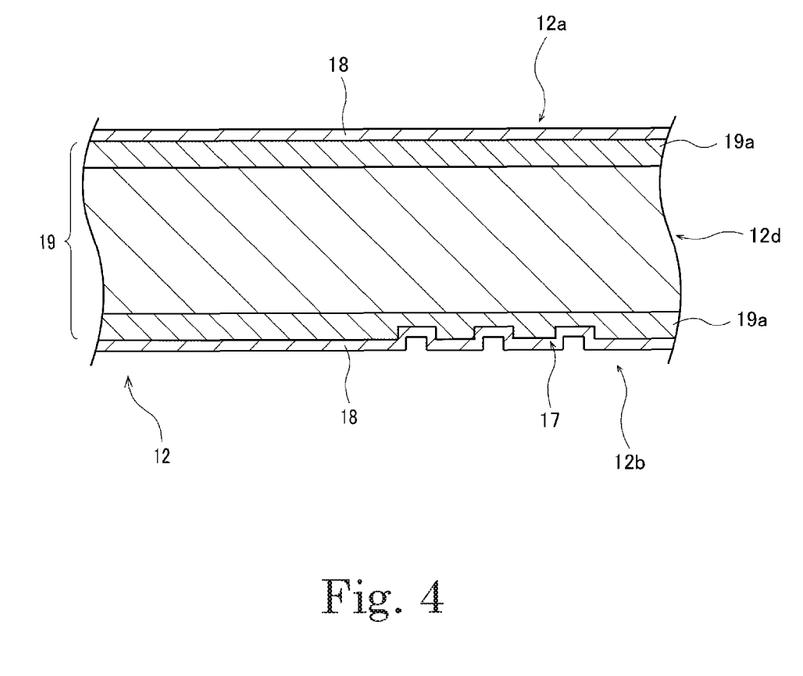
FIG. 4 is a diagram illustrating a section of a portion of an increased thickness portion of a base member according to a preferred embodiment of the present invention.

Hereinafter, the procedure for manufacturing the base member 12 according to the present preferred embodiment, and, by extension, a procedure for manufacturing the disk drive apparatus 1, will be described below with reference to FIGS. 3 and 4. FIG. 3 is a flowchart illustrating the procedure for manufacturing the disk drive apparatus 1 including the base member 12. FIG. 4 is a sectional view illustrating a portion of the molded base body 19 with the information mark 17 placed thereon and provided with the insulating coating.

First, the base body 19 is manufactured as a cast (step S1). Specifically, the molten metal, which is a material of the base body 19, is poured into a cavity defined by a pair of molds. Aluminum or an aluminum alloy, for example, is used as the molten metal. Then, the molten metal is hardened in the molds. As a result, the base body 19 is defined. Thereafter, the molds are opened, and the base body 19 is separated from the molds.

At the time of this casting, for each individual base body 19, various casting parameters are recorded in a production management database, with the various casting parameters being associated with the casting machine number for identifying the casting machine used for the casting, and the casting date and time for identifying the date and time of the casting. Here, the casting parameters include about 40 types of parameters concerning casting conditions, such as, for example, a temperature at the time of the casting, in addition to the minimum injection speed, the maximum injection speed, and the casting pressure mentioned above. At step S1, a chill layer 19a (see FIG. 4) is defined at a portion which is in contact with surfaces of the molds when the molten metal is poured into the molds. In other words, the chill layer 19a is defined at a surface portion which is quickly cooled because of being in contact with the molds at the time of the casting.

After step S1, the information mark 17 is engraved on the rear surface of the base body 19 using the laser marker (step S2). Specifically, portions of the aforementioned chill layer 19a are shaved off by processing the rear surface of the base body 19 with the laser, so that the information mark 17 as illustrated in FIGS. 2 and 4 is engraved.

After step S2, the insulating coating layer 18 is defined on an outermost layer of the base body 19 (step S3). An epoxy resin, for example, is used as a material of the insulating coating layer 18. At step S3, for example, the base body 19 is immersed in the epoxy resin in a liquid phase, and an electric current is passed between the epoxy resin and the base body 19. As a result, the epoxy resin is adhered to the surface of the base body 19. Thus, the insulating coating layer 18 is defined on the surface of the base body 19. At this time, the information mark 17, which was engraved at step S2, is covered by the insulating coating layer (see FIG. 4).

After step S3, front and rear surfaces of the base body 19 are subjected to processes. As a result, the structure of details, such as, for example, a recess(es) and a projection(s) for installing the spindle motor 11 and the access portion 15 on the inner surface 12a of the base member 12 (the base body 19), and a recess(es) and a projection(s) for attaching the circuit board 16 to the rear surface 12b of the base member 12, is defined. In addition, other processes are performed, including processing of a mating surface of the base member 12 to enable the base member 12 to be fixed to the cover 13 so as to ensure airtightness.

Next, a dimensional inspection of the base member 12 is performed (step S4). Here, for example, only when a dimensional error is less than a specified value, a result of the dimensional inspection of the base member 12 is determined to be "passed", and control proceeds to the next step S5. At this time, the information mark 17 placed on the base member 12 is read through visual inspection and the reading device. Then, the result of the above dimensional inspection is registered in the production management database, with the casting information represented by the information mark 17 being associated with the result (step S8).

Meanwhile, when the dimensional error is equal to or higher than the specified value, the result of the dimensional inspection of the base member 12 is determined to be "failed", and control does not proceed to the next step S5. Even in this case, the information mark 17 placed on the base member 12 is read through visual inspection and the reading device. Then, the result of the above dimensional inspection is registered in the production management database, with the casting information represented by the information mark 17 being associated with the result (step S8).

If, as a result of the reading of the information mark 17 at step S8, it is found necessary to refer to more casting parameters, in addition to the casting parameters included in the two-dimensional image portion 17b of the information mark 17, the aforementioned production management database is consulted. Thus, other casting information associated with the information of the casting machine number and the casting date and time of this base member 12 (the base body 19) can be acquired.

Thus, it is possible to consider whether a cause for an abnormality can be found in the casting process performed at step S1, when the result of the dimensional inspection has been determined to be "failed". In more detail, for example, it is possible to accumulate information of the casting parameters of a plurality of cases for which the result of the dimensional inspection has been determined to be "failed", and to consider whether there is any casting parameter common to the cases. In addition, it is possible to compare the casting parameters of a plurality of cases for which the result of the dimensional inspection has been determined to be "passed" with the casting parameters of a plurality of cases for which the result of the dimensional inspection has been determined to be "failed" to find differences therebetween, and thus narrow down the casting parameters that may be a cause for an abnormality. If a casting parameter which is a cause for an abnormality is successfully identified, this casting parameter can be checked and modified as necessary to reduce the likelihood that the same cause will produce a "failed" result of the dimensional inspection in subsequent manufacturing processes.

If the result of the dimensional inspection at step S4 is determined to be "passed", an airtightness inspection of the base member 12 is next performed (step S5). Here, only when it has been found that airtightness of an interior of the base member 12 and the cover 13 fixed to each other will be maintained with high accuracy, a result of the airtightness inspection of the base member 12 is determined to be "passed", and control proceeds to the next step S6. At this time, the information mark 17 placed on the base member 12 is read. Then, the result of the above airtightness inspection is registered in the production management database, with the casting information represented by the information mark 17 being associated with the result (step S8).

Meanwhile, when it has been found that the airtightness of the interior of the base member 12 and the cover 13 fixed to each other will not be maintained with high accuracy, the result of the airtightness inspection is determined to be "failed", and control does not proceed to the next step S6. Even in this case, the information mark 17 placed on the base member 12 is read. Then, the result of the above airtightness inspection is registered in the production management database, with the casting information represented by the information mark 17 being associated with the result (step S8).

As described above, after the airtightness inspection, the casting parameters contained in the information mark 17 are acquired. In addition, the aforementioned production management database is consulted as necessary. Thus, it is possible to consider whether a cause for an abnormality can be found in the casting process performed at step S1, when the result of the airtightness inspection has been determined to be "failed". In addition, in accordance with a result of this consideration, the casting parameters can be checked and modified as necessary to reduce the likelihood that the same cause will produce a "failed" result of the airtightness inspection in subsequent manufacturing processes.

If the result of the airtightness inspection at step S5 is determined to be "passed", the spindle motor 11 is next mounted on the base member 12 (step S6). Then, the spindle motor 11 is experimentally driven, with the spindle motor 11 and so on installed on the base member 12, to perform a motor characteristic inspection (step S7). Only when motor characteristics during the experimental operation of the spindle motor 11 have been found to be satisfactory, a result of the motor characteristic inspection is determined to be "passed", and control proceeds to a preparation for shipment. At this time, the information mark 17 placed on the base member 12 is read. Then, the result of the above motor characteristic inspection is registered in the production management database, with the casting information represented by the information mark 17 being associated with the result (step S8).

If the result of the motor characteristic inspection is determined to be "passed", an information mark (not shown) which is a two-dimensional image representing a serial number and manufacturing information of the spindle motor 11, information of the result of the above motor characteristic inspection, etc., is, in the form of a sticker, for example, stuck onto an outermost layer of the rear surface 12b of the base member 12.

If all the above inspections (steps S4, S5, and S7) have been passed, and assembly has been completed by the above-described procedure, an assembly including the spindle motor 11 and the base member 12 is shipped as a product.

Meanwhile, if the result of the motor characteristic inspection is determined to be "failed", control does not proceed to the preparation for shipment. Even in this case, the information mark 17 placed on the base member 12 is read. Then, the result of the above motor characteristic inspection is registered in the production management database, with the casting information represented by the information mark 17 being associated with the result (step S8).

As described above, after the motor characteristic inspection, the casting parameters contained in the information mark 17 are acquired. In addition, the aforementioned production management database is consulted as necessary. Thus, it is possible to consider whether a cause for an abnormality can be found in the casting process performed at step S1, when the result of the motor characteristic inspection has been determined to be "failed". In addition, in accordance with a result of this consideration, the casting conditions (i.e., the casting parameters) can be modified as appropriate to achieve an improvement in quality of the base member 12. This will lead to an improved product yield.

In addition, although not shown in the figures, if some abnormality occurs after the aforementioned assembly is shipped as a product, the information mark 17 is read in a manner similar to that of the above-described step S8, and the casting parameters registered in the production management database are referred to as necessary. Thus, it is possible to consider whether a cause for the abnormality can be found in the casting process performed at an earlier step (i.e., step S1) even after the provision to the market.

It should be noted here that it is generally difficult to determine whether the casting process had any problem immediately after a cast, such as the base body 19, is molded using a mold. However, this is not the case with the manufacturing procedure according to the present preferred embodiment. In the case of the manufacturing process according to the present preferred embodiment, if some abnormality occurs, for example, after various production processes (e.g., after the processing of the inner surface and the outer surface, after the airtightness inspection, after the mounting of the spindle motor 11, etc.) or after the provision to the market, after the base body 19 molded by casting is provided with the insulating coating, it is possible to consider whether a cause for the abnormality can be found in the casting process performed at an earlier step by acquiring the casting information from the information mark 17. In addition, it is possible to feed the result of this consideration back to the casting process, and, for example, modify the casting conditions (i.e., the casting parameters) as appropriate to achieve an improvement in the quality of the base member 12.

In particular, in the case where the gas (in the present preferred embodiment, helium) having a density lower than that of air is sealed in the casing defined by the base member 12 and the cover 13, it is necessary to maintain a high level of airtightness. Associating the result of the airtightness inspection (step S5) with the casting information after the airtightness inspection, for example, makes it possible to identify a casting parameter that may be a cause for poor airtightness. This will lead to an improved yield, and a reduction in a cost of scrapping nonconforming items.

In addition, in the present preferred embodiment, the information mark 17 is placed on the surface of the base body 19 before the insulating coating layer 18 is defined after the casting of the base body 19. Accordingly, an information mark reflecting the casting information can be easily placed on each individual base body 19.

Further, the numeric string portion 17a of the information mark 17 according to the present preferred embodiment includes the information of the casting machine number and the casting date and time. Accordingly, when some abnormality has occurred, it is possible to read the information of the casting machine number and the casting date and time of the base member 12 from the information mark 17 thereof. Additionally, it is possible to acquire other casting information associated with the information of the casting machine number and the casting date and time by consulting the production management database for the base member 12, which is prepared separately, for example. Thus, it is possible to identify a casting parameter that may be a cause for the abnormality.

In addition, the information mark 17 is placed on the rear surface 12b of the base member 12 according to the present preferred embodiment. This makes it possible to easily read the information mark 17 from outside the casing to acquire the casting information, even after the spindle motor 11, the cover 13, and other members are mounted on the base member 12. Accordingly, it is easy to consider whether a problem can be found in the casting process even at a later time.

As mentioned earlier, along with the information mark 17, the information mark representing the serial number, the result of the motor characteristic inspection, etc., of the spindle motor 11 mounted on the base member 12 may be placed on the rear surface 12b of the base member 12. This will make it possible to read the information mark of the spindle motor 11 in addition to the information mark 17. This makes it easy to acquire motor information together with the casting information, which leads to improved working efficiency.

In addition, in the base member 12 according to the present preferred embodiment, the two-dimensional image portion 17b of the information mark 17 contains the information of the minimum injection speed, the maximum injection speed, and the casting pressure. This makes it possible to acquire more information concerning the casting, in addition to the casting machine number and the casting date and time, by reading the information mark 17. This makes it possible to quickly identify a casting parameter that may be a cause for an abnormality.

In addition, in the base member 12 according to the present preferred embodiment, a portion of the information mark 17 is the two-dimensional image portion 17b, which enables the information mark 17 to contain much casting information using a limited space.

In addition, in the present preferred embodiment, the information mark 17 is placed on the rear surface of the base body using the laser marker, and thus, the placement of the information mark 17 can be accomplished in a relatively inexpensive and easy manner. Moreover, visibility of the information mark 17 even after the provision of the insulating coating can be ensured.

In addition, in the present preferred embodiment, the information mark 17 is placed on a portion of the rear surface 12b of the base body 19 (the base member 12) which corresponds to the increased thickness portion 12d. This arrangement has the following advantages. That is, in the case where the information mark 17 is engraved and thereby placed on the rear surface of the base body 19 as in the present preferred embodiment, the chill layer 19a at the outermost layer of the base body 19 is partly shaved off in the engraved area (see FIG. 4). Accordingly, in the present preferred embodiment, the information mark 17 is placed on the increased thickness portion 12*d*, and the above shaving off of portions of the chill layer 19*a* does not result in a failure to ensure the sealing of the gas in the casing because of the axial thickness of the material. Moreover, the information mark 17 can be placed on the increased thickness portion 12*d* by an easy process.

In addition, in the present preferred embodiment, the information mark 17 is placed on the increased thickness portion 12*d* inside of the disk shroud 12*c*, and thus, the information mark 17 is arranged in a reasonable place which can be easily processed.

In addition, regarding the disk drive apparatus 1 according to the present preferred embodiment, the improved quality of the base member 12 results in an improvement in quality of the disk drive apparatus 1 as a whole. This leads to an improved yield, and a reduction in a cost of scrapping nonconforming items.

While a preferred embodiment of the present invention has been described above, it is to be understood that the present invention is not limited to the above-described preferred embodiment.

In the above-described preferred embodiment, the information mark 17 includes the numeric string portion 17*a*, which is visually readable by a human, and the two-dimensional image portion 17*b*, which is readable by a reading device. Note, however, that this is not essential to the present invention. For example, the information mark may alternatively be made up of only the two-dimensional image portion 17*b* or only the numeric string portion 17*a*. Also note that the information mark may alternatively include a string of alphabetic characters or a one-dimensional bar code, in place of or in addition to any of the above.

In the above-described preferred embodiment, the information mark 17 is engraved on the rear surface 12*b* of the base member 12 (the base body 19) using the laser marker. Note, however, that the placement of the information mark 17 may alternatively be achieved by any other desirable method. For example, the information mark 17 may alternatively be printed by a chemical etching process or a cutting process.

In the above-described preferred embodiment, the two-dimensional image portion 17*b* includes, in addition to the casting machine number and the casting date and time, the information of the minimum injection speed, the maximum injection speed, and the casting pressure as information of other casting parameters. Note, however, that this is not essential to the present invention. For example, the two-dimensional image portion 17*b* may include neither the casting machine number nor the casting date and time, because both the casting machine number and the casting date and time are included in the information of the numeric string portion 17*a*. Also note that the two-dimensional image portion 17*b* may include information other than the above three casting parameters, such as, for example, information of the temperature at the time of the casting.

In the above-described preferred embodiment, the information mark 17 includes the casting machine number and the casting date and time. Note, however, that this is not essential to the present invention. It may be sufficient if the information mark 17 includes information that can uniquely identify the base member 12 (the disk drive apparatus 1) manufactured. For example, the information mark 17 may alternatively include a serial number that is sequentially issued to each individual base member 12 manufactured.

In the above-described preferred embodiment, the information mark 17 is placed on the rear surface 12*b* of the base member 12. This arrangement has an advantage in that the information mark 17 can be easily read even at a later time. Note, however, that the information mark 17 may not necessarily be placed on the rear surface 12*b* of the base member 12, but may alternatively be placed on a front surface or a side surface of the base member, for example.

In the above-described preferred embodiment, the information mark (not shown) representing the information concerning the spindle motor 11 is placed on the rear surface 12*b* of the base member 12 together with the information mark 17. Note, however, that the information mark (not shown) representing the information concerning the spindle motor 11 may be omitted.

Note that the procedure for manufacturing the base member 12 and the disk drive apparatus 1 according to the above-described preferred embodiment is merely an example procedure, and that an additional process or processes may be included in the procedure. Examples of such additional processes include an annealing process, a precutting process, and an impregnating process.

In the above-described preferred embodiment, the results of the inspections (steps S4, S5, and S7) are registered in the production management database regardless of whether the results have been determined to be "passed" or "failed". Note, however, that this is not essential to the present invention. For example, the results of the inspections may alternatively be stored in the database only when the results have been determined to be "failed". Then, a casting parameter common to base members 12 with respect to which an abnormality has occurred may be searched for.

While a preferred embodiment of the present invention and several modifications thereof have been described above, it should be noted that features of the above-described preferred embodiment and the modifications thereof may be combined appropriately as long as no conflict arises.

Preferred embodiments of the present invention are applicable to, for example, base members and disk drive apparatuses including the base members.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base member structured to define a portion of a casing in which a gas with a density lower than that of air is to be sealed and to support a motor to be housed in the casing, the base member comprising:
   a base body made of a cast material;
   an information mark including casting information and located on a portion of a surface of the base body; and
   an insulating coating layer defined on the surface of the base body; wherein
   the insulating coating layer covers the information mark; and
   the base body includes:
   a decreased thickness portion; and
   an increased thickness portion with a thickness greater than that of the decreased thickness portion; and the information mark is located on a surface of the increased thickness portion within the surface of the base body.

2. The base member according to claim 1, wherein the casting information includes information of a casting machine number and a casting date and time.

3. The base member according to claim 2, wherein the base body includes:
a first surface on which the motor is provided; and
a second surface defining a rear surface opposite to the first surface; and
the information mark is located on the second surface.

4. The base member according to claim 1, wherein
the casting information includes at least one of a minimum injection speed, a maximum injection speed, and a casting pressure;
each of the minimum and maximum injection speeds is a speed at which a molten material is poured into a mold when the base body is cast; and
the casting pressure is a pressure applied when the molten material is forced into the mold.

5. The base member according to claim 1, wherein the information mark includes a two-dimensional image.

6. The base member according to claim 1, wherein the information mark is a laser-marked portion on the surface of the base body.

7. The base member according to claim 1, further comprising a disk shroud extending along an outer circumference of a disk to be rotated by the motor; wherein the disk is housed in the casing; and
the increased thickness portion is located inside of the disk shroud when viewed in an axial direction parallel or substantially parallel to a rotation axis of the motor.

8. The base member according to claim 7, wherein the increased thickness portion has a shape of a circular arc radially outside of a region centered on the rotation axis and having a radius equal to about one half of a distance from the rotation axis to the outer circumference of the disk when viewed in the axial direction.

9. The base member according to claim 7, wherein
the increased thickness portion has a shape of a circular arc in a region extending from an inner circumferential portion of a recording layer of the disk to an outer circumferential portion of the disk when viewed in the axial direction; and
the recording layer includes a metal film.

10. A disk drive apparatus comprising:
the base member of claim 1;
a cover member defining a remaining portion of the casing excluding the portion defined by the base member;
a disk housed in the casing and to be rotated by the motor; and
an access portion housed in the casing and to perform at least one of reading and writing of information from or to the disk.

* * * * *